US012578452B2

(12) United States Patent
Kuroda et al.

(10) Patent No.: US 12,578,452 B2
(45) Date of Patent: Mar. 17, 2026

(54) ELECTRONIC DEVICE, METHOD FOR CONTROLLING ELECTRONIC DEVICE, AND PROGRAM

(71) Applicant: KYOCERA Corporation, Kyoto (JP)

(72) Inventors: Jun Kuroda, Kodaira (JP); Tooru Sahara, Yokohama (JP); Kenji Yamamoto, Yokohama (JP); Takuya Homma, Yokohama (JP); Fangwei Tong, Machida (JP)

(73) Assignee: KYOCERA Corporation, Kyoto (JP)

( * ) Notice: Subject to any disclaimer, the term of this patent is extended or adjusted under 35 U.S.C. 154(b) by 423 days.

(21) Appl. No.: 18/248,276

(22) PCT Filed: Oct. 4, 2021

(86) PCT No.: PCT/JP2021/036662
§ 371 (c)(1),
(2) Date: Apr. 7, 2023

(87) PCT Pub. No.: WO2022/091708
PCT Pub. Date: May 5, 2022

(65) Prior Publication Data
US 2023/0305135 A1     Sep. 28, 2023

(30) Foreign Application Priority Data
Oct. 28, 2020     (JP) ................................. 2020-180879

(51) Int. Cl.
*G01S 13/56*          (2006.01)
*G01S 7/41*           (2006.01)
(Continued)

(52) U.S. Cl.
CPC .............. *G01S 13/56* (2013.01); *G01S 7/414* (2013.01); *G01S 13/536* (2013.01); *G01S 13/931* (2013.01)

(58) Field of Classification Search
CPC .......... G01S 7/356; G01S 7/414; G01S 7/417; G01S 7/418; G01S 13/584; G01S 13/24; G01S 13/56; G01S 13/931
(Continued)

(56) References Cited

U.S. PATENT DOCUMENTS 5,499,030 A * 3/1996 Wicks ...................... G01S 7/292
342/159
5,798,728 A 8/1998 Tomishima et al.
(Continued)

FOREIGN PATENT DOCUMENTS

CN 110095762 A * 8/2019 ........... G01S 7/4052
JP H09145829 A 6/1997
(Continued)

OTHER PUBLICATIONS

Pourmottaghi A, et al; A Robust CFAR Detection with ML Estimation; IEEE; May 26-30, 2008; Rome, Italy; pp. 1-5.
(Continued)

*Primary Examiner* — Michael W Justice
(74) *Attorney, Agent, or Firm* — Studebaker Brackett PLLC

(57)          ABSTRACT

An electronic device includes a transmission antenna, a reception antenna, and a signal processor. The transmission antenna is configured to transmit a transmission wave. The reception antenna is configured to receive a reception wave resulting from reflection of the transmission wave. The signal processor is configured to detect an object, with a constant false alarm rate, based on a transmission signal transmitted as the transmission wave and a reception signal received as the reflection wave, The signal processor selects, based on a maximum likelihood estimated value that gives a false alarm rate of signal intensity based on the reception signal, a reference cell disposed in a distance direction with
(Continued)

respect to an inspection cell in a two-dimensional distribution of signal intensity, based on the reception signal, in the distance direction and a relative velocity direction.

11 Claims, 11 Drawing Sheets

(51) Int. Cl.
*G01S 13/536* (2006.01)
*G01S 13/931* (2020.01)

(58) Field of Classification Search
USPC ......................................... 342/192, 195, 196
See application file for complete search history.

(56) References Cited

U.S. PATENT DOCUMENTS

| | | | | |
|---|---|---|---|---|
| 7,990,874 | B2 * | 8/2011 | del Rio Herrero | ........................ H04B 1/71072 370/236 |
| 8,026,842 | B2 * | 9/2011 | Fox | ...................... G01S 13/522 342/55 |
| 8,026,844 | B2 * | 9/2011 | Fox | ...................... G01S 13/867 342/195 |
| 8,102,305 | B2 * | 1/2012 | Otts | ...................... G01S 13/888 342/55 |
| 8,330,647 | B2 * | 12/2012 | Fox | ...................... G01S 13/723 342/28 |
| 8,405,540 | B2 * | 3/2013 | Porikli | .................. G01S 7/2923 342/91 |
| 9,030,351 | B2 * | 5/2015 | Fox | ...................... G01S 13/723 342/28 |
| 9,157,992 | B2 * | 10/2015 | Wang | ...................... G01S 13/04 |
| 9,250,317 | B1 * | 2/2016 | Wang | ................... G01S 13/424 |
| 9,696,409 | B2 * | 7/2017 | Fox | ...................... G01S 13/522 |
| 10,151,833 | B2 * | 12/2018 | Borgonovo | ........... G01S 7/2922 |
| 10,488,507 | B2 * | 11/2019 | Adachi | ................. G01S 13/931 |
| 10,634,783 | B2 * | 4/2020 | Borgonovo | ........... G01S 7/2806 |
| 11,269,042 | B2 * | 3/2022 | Kishigami | ........... G01S 7/2883 |

| | | | | |
|---|---|---|---|---|
| 2009/0015460 | A1 * | 1/2009 | Fox | ...................... G01S 13/867 342/53 |
| 2010/0054131 | A1 * | 3/2010 | del Rio Herrero | ........................ H04B 1/71072 370/317 |
| 2010/0283662 | A1 * | 11/2010 | Fox | ...................... G01S 13/522 342/52 |
| 2011/0001657 | A1 * | 1/2011 | Fox | ...................... G01S 13/522 342/107 |
| 2011/0169683 | A1 * | 7/2011 | Otts | ...................... G01S 7/2921 342/159 |
| 2013/0201054 | A1 * | 8/2013 | Wang | ................... G01S 13/5246 342/93 |
| 2014/0062757 | A1 * | 3/2014 | Fox | ...................... G01S 13/867 342/52 |
| 2016/0025849 | A1 * | 1/2016 | Wang | ................... G01S 13/5244 342/59 |
| 2016/0097839 | A1 * | 4/2016 | Fox | ...................... G01S 13/723 342/52 |
| 2016/0334512 | A1 * | 11/2016 | Borgonovo | ......... G01S 13/5246 |
| 2017/0269201 | A1 * | 9/2017 | Adachi | ................. G01S 13/931 |
| 2019/0107620 | A1 * | 4/2019 | Borgonovo | .......... G01S 7/2922 |
| 2020/0096595 | A1 * | 3/2020 | Kishigami | ............. G01S 7/295 |

FOREIGN PATENT DOCUMENTS

| | | |
|---|---|---|
| JP | 2002341023 A | 11/2002 |
| JP | 2020051802 A | 4/2020 |

OTHER PUBLICATIONS

Ridha Djemal et al., "A novel hardware/software embedded system based on automatic censored target detection for radar systems", International Journal of Electronics and Communications (AEU), Sep. 11, 2012, pp. 301-312, XP-001582119, Elsevier GmbH.

Guiru Liu et al., "A blind spot detection and warning system based on millimeter wave radar for driver assistance", Optik 135, Jan. 24, 2017, pp. 353-365, XP029941970, Elsevier GmbH.

N. Levanon, et al., "Order statistic CFAR for Weibull background", IEE Proceedings, vol. 137, Pt. F, No. 3, Jun. 1990, pp. 157-162, XP000125174.

* cited by examiner

ELECTRONIC DEVICE, METHOD FOR CONTROLLING ELECTRONIC DEVICE, AND PROGRAM

CROSS-REFERENCE TO RELATED APPLICATIONS

This application claims priority of Japanese Patent Application No. 2020-180879 filed in Japan on Oct. 28, 2020 the entire disclosure of which is hereby incorporated by reference.

TECHNICAL FIELD

The present disclosure relates to an electronic device, a method for controlling an electronic device, and a program.

BACKGROUND OF INVENTION

In fields such as industries related to automobiles, for example, technologies for measuring the distance between a host vehicle and a prescribed object are becoming increasingly important. In particular, in recent years, various studies have been conducted on radar (radio detecting and ranging ((RADAR)) technologies. In these technologies, the distance to an object is measured by transmitting radio waves, such as millimeter waves, and receiving waves reflected from an object, such as an obstacle. The importance of such technologies for measuring distances so forth is expected to further increase in the future with the development of technologies for assisting drivers in driving and technologies related to automated driving that allow part or all of the driving process to be automated.

In technologies such as radar described above, suppressing false alarms caused by reflections from things other than objects (targets), known as clutter, is important. Constant false alarm rate (CFAR) processing is known as a technique for suppressing the false alarm rate (FAR) by making the FAR constant. For example, Patent Literature 1 discloses a technique related to CFAR in which control is performed for each sensor cluster, each sensor cluster being obtained by grouping sensors together into a prescribed group, while taking the states of other sensors among multiple sensors into consideration.

CITATION LIST

Patent Literature

Patent Literature 1: Japanese Unexamined Patent Application Publication No. 2002-341023

SUMMARY

In an embodiment, an electronic device includes a transmission antenna, a reception antenna, and a signal processor.

The transmission antenna is configured to transmit a transmission wave.

The reception antenna is configured to receive a reception wave resulting from reflection of the transmission wave.

The signal processor is configured to detect an object, with a constant false alarm error rate, based on a transmission signal transmitted as the transmission wave and a reception signal received as the reflection wave.

The signal processor selects, based on a maximum likelihood estimated value that gives a false alarm rate of signal intensity based on the reception signal, a reference cell disposed in a distance direction with respect to an inspection cell in a two-dimensional distribution of signal intensity, based on the reception signal, in the distance direction and a relative velocity direction.

In an embodiment, a method for controlling an electronic device, includes:

transmitting a transmission wave using a transmission antenna;

receiving a reflection wave generated by reflection of the transmission wave using a reception antenna;

detecting an object, with a constant false alarm rate, based on a transmission signal transmitted as the transmission wave and a reception signal received as the reflection wave, and selecting, based on a maximum likelihood estimated value that gives a false alarm rate of signal intensity based on the reception signal, a reference cell disposed in a distance direction with respect to an inspection cell in a two-dimensional distribution of signal intensity, based on the reception signal, in the distance direction and a relative velocity direction.

In an embodiment, a program is provided for causing a computer to execute:

transmitting a transmission wave using a transmission antenna;

receiving a reflection wave generated by reflection of the transmission wave using a reception antenna;

detecting an object, with a constant false alarm rate, based on a transmission signal transmitted as the transmission wave and a reception signal received as the reflection wave, and selecting, based on a maximum likelihood estimated value that gives a false alarm rate of signal intensity based on the reception signal, a reference cell disposed in a distance direction with respect to an inspection cell in a two-dimensional distribution of signal intensity, based on the reception signal, in the distance direction and a relative velocity direction.

BRIEF DESCRIPTION OF THE DRAWINGS

FIG. 2 is a functional block diagram schematically illustrating the configuration of the electronic device according to the embodiment.

FIG. 7 is a diagram for describing processing of a signal performed by the electronic device according to the embodiment.

DESCRIPTION OF EMBODIMENTS

Figure 1:
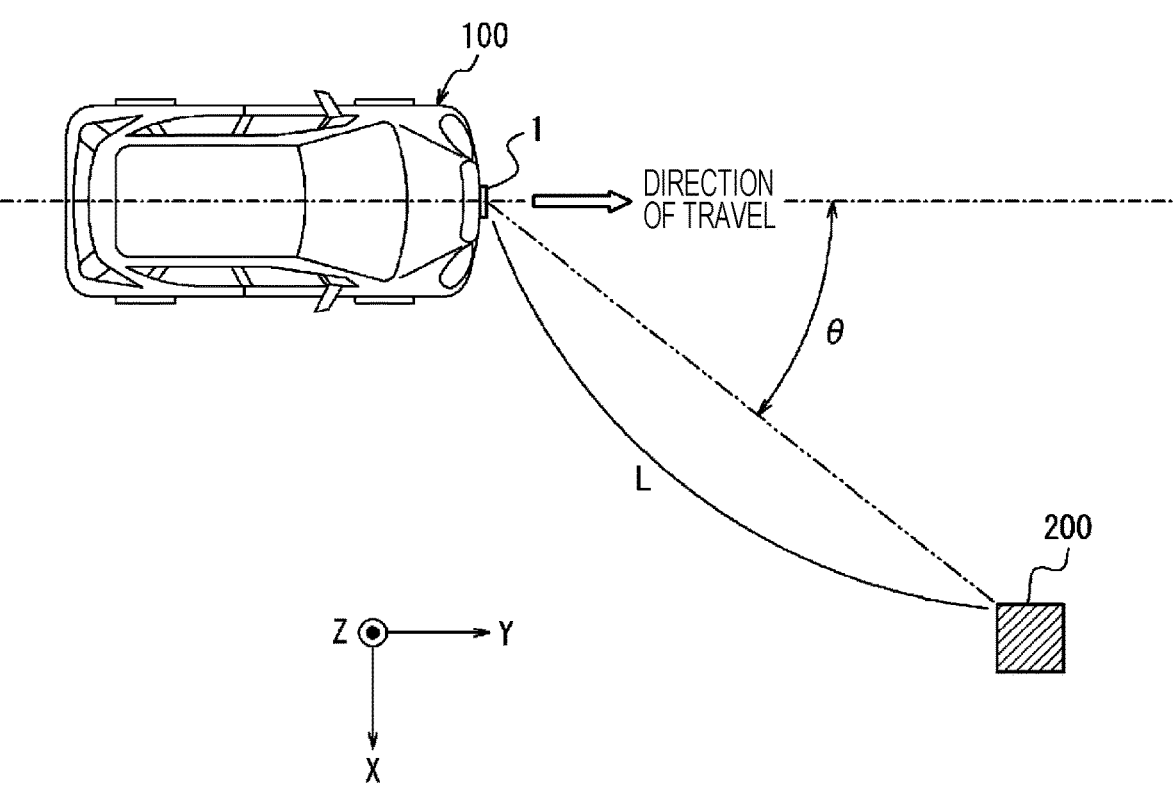
FIG. 1 is a diagram for describing a usage state of an electronic device according to an embodiment.

A technology for detecting a prescribed object with good accuracy by receiving a reflection wave resulting from a transmitted transmission wave being reflected by the object is desirable. An object of the present disclosure is to provide an electronic device, a method for controlling an electronic device, and a program with which an object can be detected with good accuracy. According to an embodiment, an electronic device, a method for controlling an electronic device, and a program with which an object can be detected with good accuracy can be provided. Hereafter, an embodiment will be described in detail while referring to the drawings.

An electronic device according to an embodiment is installed in a vehicle (mobile object) such as an automobile and is capable of detecting a prescribed object located in the surroundings of the mobile object as a target. Accordingly, the electronic device according to the embodiment can transmit a transmission wave into the surroundings of the mobile object from a transmission antenna installed in the mobile object. In addition, the electronic device according to the embodiment can receive a reflection wave from a reception antenna installed in the mobile object, the reflection wave being generated by the transmission wave being reflected. At least one out of the transmission antenna and the reception antenna may be, for example, provided in a radar sensor or the like installed in the mobile object.

Hereinafter, as a typical example, a configuration will be described in which the electronic device according to the embodiment is mounted in an automobile such as a passenger vehicle. However, the electronic device according to the embodiment is not limited to being mounted in an automobile. The electronic device of the embodiment may be installed in any of a variety of mobile objects such as self-driving cars, buses, taxis, trucks, taxis, motorcycles, bicycles, ships, aircraft, helicopters, agricultural equipment such as tractors, snowplows, sweepers, police cars, ambulances, and drones. Furthermore, the electronic device according to the embodiment is not necessarily limited to being installed in mobile objects that move under their own power. For example, the mobile object in which the electronic device according to the embodiment is installed may be a trailer part towed by a tractor. The electronic device according to the embodiment can measure the distance between a sensor and a prescribed object or the like in a situation where at least one out of the sensor and the object is able to move. The electronic device according to the embodiment can measure the distance between the sensor and the object or the like even when both the sensor and the object are stationary. Automobiles included in the present disclosure are not limited by overall length, width, height, displacement, capacity, or load capacity. For example, automobiles of the present disclosure include automobiles having a displacement greater than 660 cc, and automobiles having a displacement less than or equal to 660 cc, i.e., so-called light automobiles. Automobiles included in the present disclosure also include automobiles that use electricity as part or all of their energy and use motors.

First, an example of detection of an object performed by the electronic device according to the embodiment will be described.

FIG. 1 is a diagram for describing a usage state of the electronic device according to the embodiment. FIG. 1 illustrates an example in which the electronic device according to the embodiment is installed in a mobile object, the electronic device being equipped with a transmission antenna and a reception antenna.

An electronic device 1 according to the embodiment is installed in a mobile object 100 illustrated in FIG. 1. The electronic device 1 includes a transmission antenna and a reception antenna. The electronic device 1 according to the embodiment may be installed in (for example, built into) the mobile object 100 illustrated in FIG. 1. The specific configuration of the electronic device 1 will be described below. As described below, the electronic device 1 may include, for example, at least one out of a transmission antenna and a reception antenna. The mobile object 100 illustrated in FIG. 1 may be a vehicle such as an automobile like a passenger car, but may be any suitable type of mobile object. In FIG. 1, the mobile object 100 may, for example, be moving (traveling or slowing down) in the positive Y-axis direction (direction of travel) indicated in the figure, may be moving in another direction, or may be stationary and not moving.

As illustrated in FIG. 1, the electronic device 1 including a transmission antenna is installed in the mobile object 100. In the example illustrated in FIG. 1, only one electronic device 1, which includes a transmission antenna and a reception antenna, is installed at the front of the mobile object 100. The position where the electronic device 1 is installed on or in the mobile object 100 is not limited to the position illustrated in FIG. 1, and may be another position, as appropriate. For example, the electronic device 1 illustrated in FIG. 1 may be installed at the left side, the right side, and/or the rear of the mobile object 100. The number of electronic devices 1 may be any suitable number of one or more depending on various conditions (or requirements) such as the range and/or accuracy of measurement in the mobile object 100. The electronic device 1 may be installed inside the mobile object 100. The inside of the mobile object 100 may be, for example, the space inside a bumper, the space inside the body, the space inside a headlight, or the driver's space.

The electronic device 1 transmits an electromagnetic wave as a transmission wave from the transmission antenna. For example, when there is a prescribed object (for example, an object 200 illustrated in FIG. 1) in the surroundings of the mobile object 100, at least part of a transmission wave transmitted from the electronic device 1 will be reflected by the object and become a reflection wave. The reflection wave is, for example, received by the reception antenna of the electronic device 1, and in this way, the electronic device 1 installed in the mobile object 100 is able to detect the object as a target.

The electronic device 1 including the transmission antenna may typically be a radar (radio detecting and ranging (RADAR)) sensor that transmits and receives radio waves. However, the electronic device 1 is not limited to being a radar sensor. The electronic device 1 according to the embodiment may be a sensor based on light detection and ranging or laser imaging detection and ranging (LIDAR) technologies utilizing light waves. These kind of sensors may include patch antennas, for example. Since technologies such as RADAR and LIDAR are already known, detailed description thereof may be simplified or omitted as appropriate.

The electronic device 1 installed in the mobile object 100 illustrated in FIG. 1 receives, from the reception antenna, a reflection wave generated from a transmission wave transmitted from the transmission antenna. In this way, the electronic device 1 can detect the prescribed object 200 existing within a prescribed distance from the mobile object 100 as a target. For example, as illustrated in FIG. 1, the electronic device 1 can measure a distance L between the mobile object 100, which is the host vehicle, and the prescribed object 200. The electronic device 1 can also measure the relative speed of the mobile object 100, which is the host vehicle, and the prescribed object 200. The electronic device 1 can also measure the direction (arrival angle θ) in which the reflection wave reflected from the prescribed object 200 arrives at the mobile object 100, which is the host vehicle.

The object 200 may be at least one out of, for example, an oncoming vehicle traveling in a lane adjacent to the mobile object 100, a car traveling next to the mobile object 100, and vehicles in front of and behind and traveling in the same lane as the mobile object 100. The object 200 may be any object that exists around the mobile object 100 such as a motorcycle, a bicycle, a stroller, a person such as a pedestrian, a living organism such as an animal or an insect, a guardrail, a median strip, a road sign, a sidewalk step, a wall, a manhole, or an obstacle. In addition, the object 200 may be in motion or stationary. For example, the object 200 may be an automobile that is parked or stationary in the surroundings of the mobile object 100.

In FIG. 1, the ratio of the size of the electronic device 1 to the size of the mobile object 100 does not necessarily represent the actual ratio. In FIG. 1, a state is illustrated in which the electronic device 1 is installed on the outside of the mobile object 100. However, in an embodiment, the electronic device 1 may be installed at any of various positions on or in the mobile object 100. For example, in an embodiment, the electronic device 1 may be installed inside a bumper of the mobile object 100 so that the electronic device 1 does not appear outside the mobile object 100.

Hereinafter, as a typical example, the transmission antenna of the electronic device 1 will be described as transmitting radio waves in a frequency band such as a millimeter wave band (greater than or equal to 30 GHz) or a quasi-millimeter wave band (for example, around 20 GHz to 30 GHz). For example, the transmission antenna of a sensor 5 may transmit radio waves with a frequency bandwidth of 4 GHz, such as from 77 GHz to 81 GHz.

Figure 2:
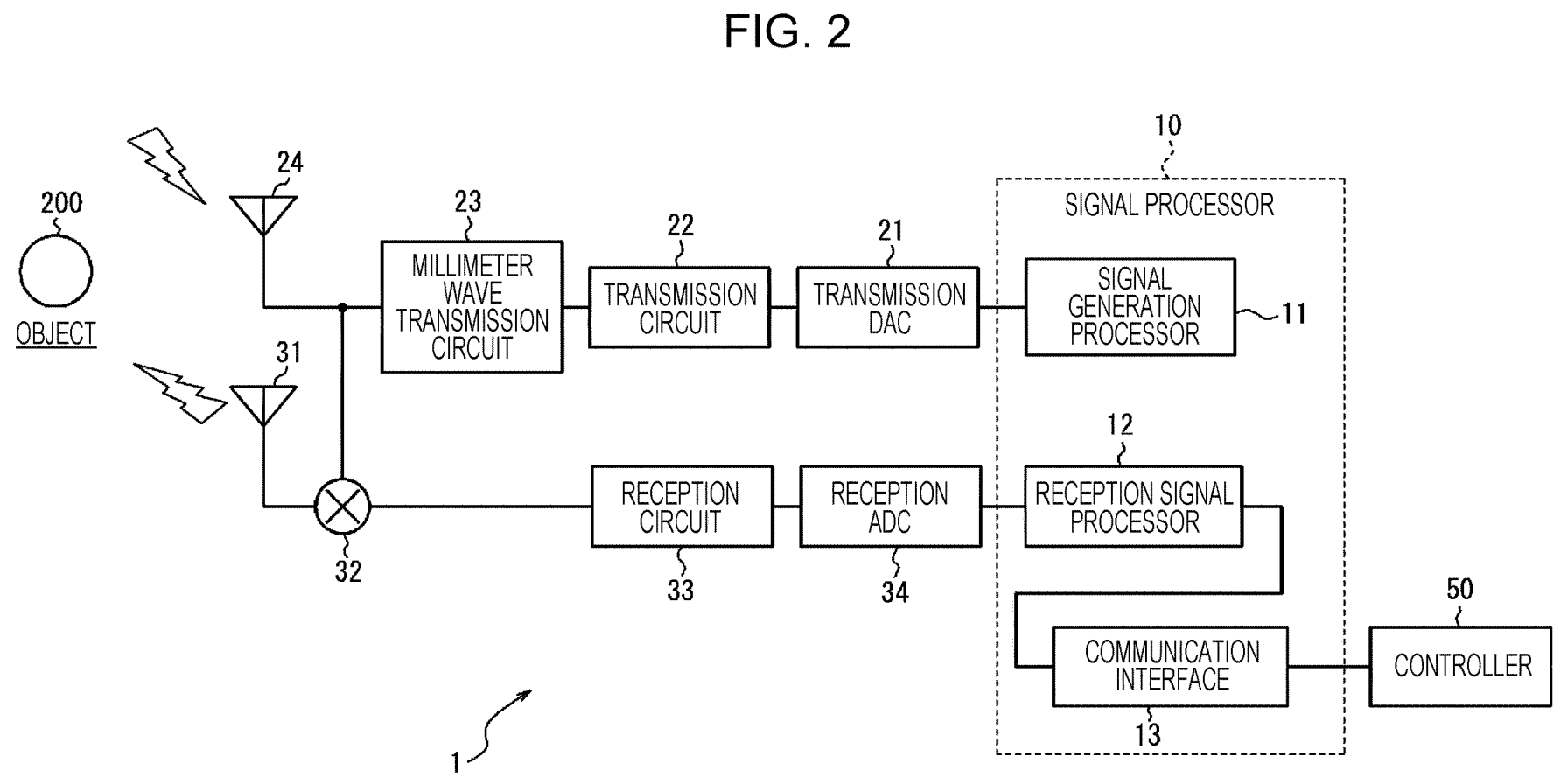

FIG. 2 is a functional block diagram schematically illustrating an example configuration of an electronic device 1 according to an embodiment. Hereafter, an example of the configuration of the electronic device 1 according to the embodiment will be described.

Frequency-modulated continuous wave radar (hereinafter referred to as FMCW radar) is often used to measure distances using millimeter-wave radar. In FMCW radar, the transmission signal is generated by sweeping the frequency of the radio waves to be transmitted. Therefore, for example, in a millimeter-wave FMCW radar that uses radio waves in the 79 GHz frequency band, the frequency of the radio waves being used will have a frequency bandwidth of 4 GHz, for example, from 77 GHz to 81 GHz. Radar in the 79 GHz frequency band is characterized by having a wider usable frequency bandwidth than other millimeter/quasi-millimeter wave radars, for example, in the 24 GHz, 60 GHz, and 76 GHz frequency bands. Hereafter, such an embodiment will be described as an example.

As illustrated in FIG. 2, the electronic device 1 according to the embodiment includes a signal processor 10. The signal processor 10 may include a signal generation processor 11, a reception signal processor 12, and a communication interface 13. The electronic device 1 according to the embodiment includes a transmission DAC 21, a transmission circuit 22, a millimeter wave transmission circuit 23, and a transmission antenna array 24 as a transmission section. The electronic device 1 according to the embodiment further includes a reception antenna array 31, a mixer 32, a reception circuit 33, and a reception ADC 34 as a reception section. The electronic device 1 according to the embodiment need not include all of the functional units illustrated in FIG. 2 and may include functional units other than those illustrated in FIG. 2. The electronic device 1 illustrated in FIG. 2 may be configured using circuits that are basically the same as those used in general radars that use electromagnetic waves in the millimeter wave band or the like. However, in the electronic device 1 according to the embodiment, signal processing performed by the signal processor 10 includes processing that differs from that performed by general radars of the related art.

The signal processor 10 of the electronic device 1 according to the embodiment can control overall operation of the electronic device 1 including control of each functional unit constituting the electronic device 1. In particular, the signal processor 10 performs various types of processing on the signals handled by the electronic device 1. The signal processor 10 may include at least one processor, such as a central processing unit (CPU) or a digital signal processor (DSP), in order to provide control and processing power to perform various functions. The signal processor 10 may be implemented collectively in a single processor, in several processors, or in individual processors. The processors may be implemented as a single integrated circuit. An integrated circuit may also be referred to as an IC. Processors may be implemented as multiple integrated circuits and discrete circuits connected so as to be able to communicate with each other. The processors may be realized based on various other known technologies. In the embodiment, the signal processor 10 may be configured, for example, as a CPU (hardware) and a program (software) executed by the CPU. The signal processor 10 may appropriately include a memory as needed for the operation of signal processor 10.

The signal generation processor 11 of the signal processor 10 generates a signal to be transmitted from the electronic device 1. In the electronic device 1 according to the embodiment, the signal generation processor 11 may generate a transmission signal (transmission chirp signal), such as a chirp signal. In particular, the signal generation processor 11 may generate a signal having a frequency that varies periodically and linearly (linear chirp signal). For example, the signal generation processor 11 may generate a chirp signal whose frequency periodically and linearly increases from 77 GHz to 81 GHz over time. For example, the signal generation processor 11 may generate a signal whose frequency periodically repeatedly linearly increases (up chirp) and decreases (down chirp) from 77 GHz to 81 GHz over time. The signal generated by the signal generation processor 11 may be set in advance in the signal processor 10, for example. The signal generated by the signal generation processor 11 may be stored in advance in a storage unit of the signal processor 10, for example. Since chirp signals used in technical fields such as radar are known, detailed description thereof will be simplified or omitted as appropriate. The signal generated by the signal generation processor 11 is supplied to the transmission DAC 21. Therefore, the signal generation processor 11 may be connected to the transmission DAC 21.

The transmission digital-to-analog converter (DAC) 21 has a function of converting a digital signal supplied from the signal generation processor 11 into an analog signal. The DAC 21 may include a general analog-to-digital converter. The signal generated by the analog conversion performed by the transmission DAC 21 is supplied to the transmission circuit 22. Therefore, the transmission DAC 21 may be connected to the transmission circuit 22.

The transmission circuit 22 has a function of converting the signal produced by the analog conversion performed by the transmission DAC 21 into a signal of an intermediate frequency (IF) band. The transmission circuit 22 may include a general IF band transmission circuit. A signal produced by processing performed by the transmission circuit 22 is supplied to the millimeter wave transmission circuit 23. Therefore, the transmission circuit 22 may be connected to the millimeter wave transmission circuit 23.

The millimeter wave transmission circuit 23 has a function of transmitting a signal produced by processing performed by the transmission circuit 22 as a millimeter wave (RF wave). The millimeter wave transmission circuit 23 may include a general millimeter wave transmission circuit. The signal produced by processing performed by the millimeter wave transmission circuit 23 is supplied to the transmission antenna array 24. Therefore, the millimeter wave transmission circuit 23 may be connected to the transmission antenna array 24. The signal produced by the processing performed by the millimeter wave transmission circuit 23 is also supplied to the mixer 32. Therefore, the millimeter wave transmission circuit 23 may also be connected to the mixer 32.

The transmission antenna array 24 is configured by arranging multiple transmission antennas in an array pattern. In FIG. 2, the configuration of the transmission antenna array 24 is illustrated in a simplified manner. The transmission antenna array 24 transmits the signal produced by processing performed by the millimeter wave transmission circuit 23 to outside the electronic device 1. The transmission antenna array 24 may include a transmission antenna array used in a general millimeter-wave radar.

Thus, the electronic device 1 according to the embodiment includes the transmission antenna array 24 and can transmit a transmission signal (for example, a transmission chirp signal) as a transmission wave from the transmission antenna array 24.

For example, as illustrated in FIG. 2, a case in which the object 200 exists in the surroundings of the electronic device 1 is assumed. In this case, at least part of the transmission wave transmitted from the transmission antenna array 24 is reflected by the object 200. At least part of the wave reflected by object 200 out of the transmission wave transmitted from the transmission antenna array 24 may be reflected towards the reception antenna array 31.

The reception antenna array 31 receives the reflection wave. Here, the reflection wave may be at least part of the wave reflected by the object 200 out of the transmission wave transmitted from the transmission antenna array 24.

The reception antenna array 31 is configured by arranging multiple reception antennas in an array pattern. In FIG. 2, the configuration of the reception antenna array 31 is illustrated in a simplified manner. The reception antenna array 31 receives a reflection wave resulting from reflection of the transmission wave transmitted from the transmission antenna array 24. The reception antenna array 31 may include a reception antenna array used in a typical millimeter-wave radar. The reception antenna array 31 supplies a reception signal received as a reflection wave to the mixer 32. Therefore, the reception antenna array 31 may be connected to the mixer 32.

The mixer 32 converts the signal produced by processing performed by millimeter wave transmission circuit 23 (transmission signal) and the reception signal received by reception antenna array 31 into a signal of an intermediate frequency (IF) bandwidth. The mixer 32 may include a mixer used in a general millimeter wave radar. The mixer 32 supplies the resulting combined signal to the reception circuit 33. Therefore, the mixer 32 may be connected to the reception circuit 33.

The reception circuit 33 has a function of analog processing the signal converted to an IF band by the mixer 32. The reception circuit 33 may include a typical reception circuit that converts a signal into an IF band. A signal produced by processing performed by the reception circuit 33 is supplied to the reception ADC 34. Therefore, the reception circuit 33 may be connected to the reception ADC 34.

The reception analog-to-digital converter (ADC) 34 has a function of converting the analog signal supplied from the reception circuit 33 into a digital signal. The ADC 34 may include a general analog-to-digital converter. A signal digitized by the reception ADC 34 is supplied to the reception signal processor 12 of the signal processor 10. Therefore, the reception ADC 34 may be connected to the signal processor 10.

The reception signal processor 12 of the signal processor 10 has a function of performing various types of processing on a digital signal supplied from the reception DAC 34. For example, the reception signal processor 12 calculates the distance from the electronic device 1 to the object 200 (distance measurement) based on the digital signal supplied from the reception DAC 34. The reception signal processor 12 calculates the velocity of the object 200 relative to the electronic device 1 (velocity measurement) based on the digital signal supplied from the reception DAC 34. The reception signal processor 12 calculates the azimuth angle of the object 200 as seen from the electronic device 1 (angle measurement) based on the digital signal supplied from the reception DAC 34. Specifically, I/Q converted data may be input to the reception signal processor 12. In response to input of the data, the reception signal processor 12 performs a fast fourier transform (2D-FFT) in distance (Range) and velocity (Velocity) directions, respectively. After that, the reception signal processor 12 suppresses false alarms and makes the probability of false alarms constant by removing noise points through, for example, universal asynchronous receiver transmitter (UART) and/or constant false alarm rate (CFAR) processing. The reception signal processor 12 then obtains the position of the object 200 by, for example, performing arrival angle estimation for a point that satisfies the CFAR criterion. The information generated as a result of the distance, velocity, and angle measurements performed by reception signal processor 12 is supplied to communication interface 13.

The communication interface 13 of the signal processor 10 includes an interface that outputs information from the signal processor 10, for example, to an external controller 50. The communication interface 13 outputs information on at least any one of the position, velocity, and angle of the object 200, for example, as a controller area network (CAN) signal to outside the signal processor 10. Information on at least any one of the position, velocity, and angle of the object 200 is supplied to the controller 50 via the communication interface 13. Therefore, the communication interface 13 may be connected to the signal processor 10.

As illustrated in FIG. 2, the electronic device 1 according to the embodiment may be connected to the controller 50, for example, an electronic control unit (ECU), in a wireless or wired manner. The controller 50 controls various operations of the mobile object 100. The controller 50 may consist of at least one ECU.

Figure 3:
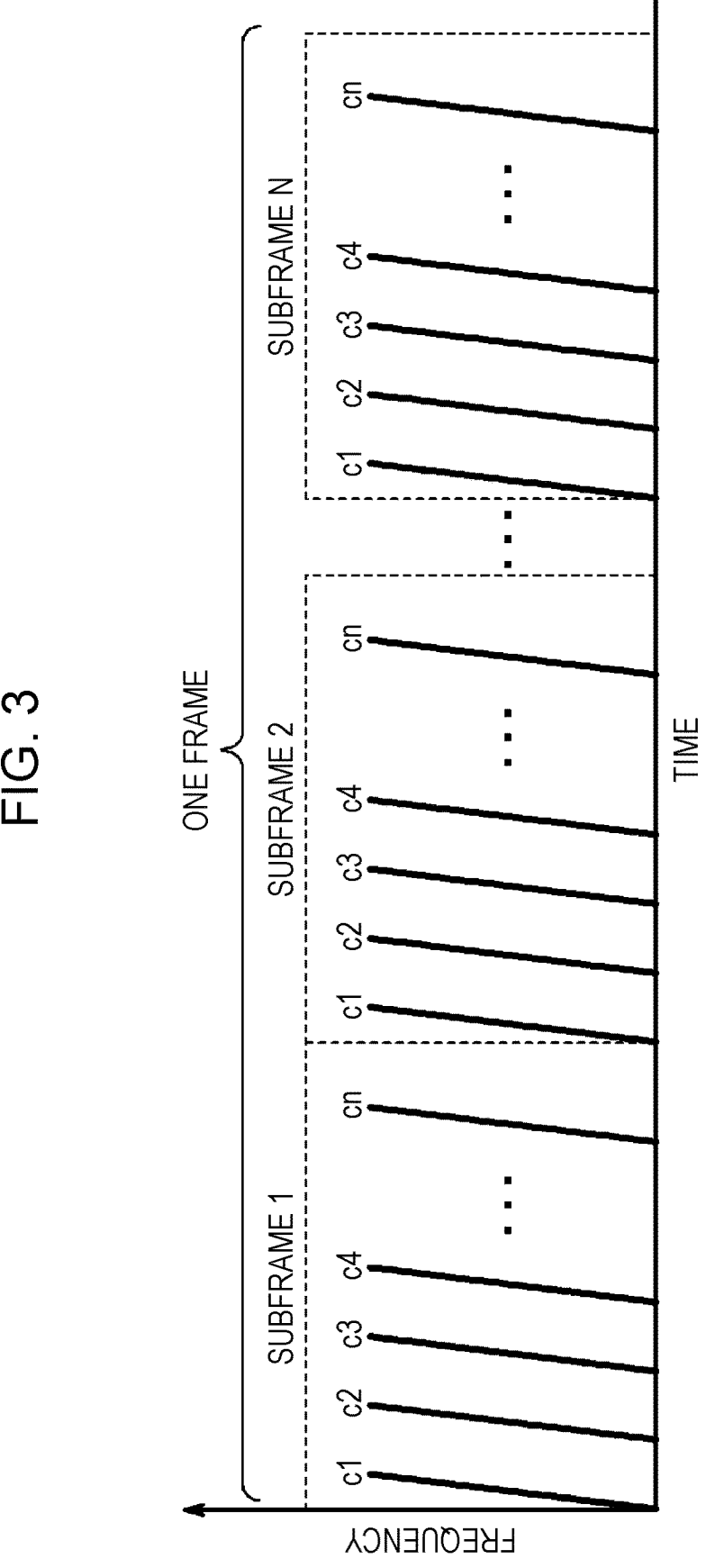
FIG. 3 is a diagram for describing the configuration of a signal processed by the electronic device according to the embodiment.

FIG. 3 is a diagram for explaining an example of chirp signals generated by the signal generation processor 11 of the signal processor 10.

FIG. 3 illustrates the temporal structure of one frame when a fast-chirp modulation (FCM) method is used. FIG. 3 illustrates an example of a reception signal of an FCM method. FCM is a method in which chirp signals, represented in FIG. 3 as c1, c2, c3, c4, . . . , cn, are repeated at short intervals (for example, greater than or equal to the round trip time between the radar and the object target for electromagnetic waves calculated from the maximum measurement distance). In FCM, for convenience of signal processing of reception signals, transmission and reception processing is often performed by dividing a signal into subframe units as illustrated in FIG. 3.

In FIG. 3, the horizontal axis represents the passage of time and the vertical axis represents frequency. In the example illustrated in FIG. 3, the signal generation processor 11 generates linear chirp signals whose frequency varies periodically and linearly. In FIG. 3, the chirp signals are illustrated as c1, c2, c3, c4, . . . , cn. As illustrated in FIG. 3, in each chirp signal, the frequency increases linearly with time.

In the example illustrated in FIG. 3, several chirp signals are included illustrated as c1, c2, c3, c4, . . . , cn and make up one subframe. That is, subframe 1, subframe 2, and so on illustrated in FIG. 3 are each composed of several chirp signals c1, c2, c3, c4, . . . , cn. In the example illustrated in FIG. 3, several subframes are included, such as subframe 1, subframe subframe N, and make up one frame. In other words, the one frame illustrated in FIG. 3 consists of N subframes. The one frame illustrated in FIG. 3 may be frame 1, and may be followed by frame 2, frame 3, . . . , and so on. Each of these frames may consist of N subframes, similarly to frame 1. A frame interval of a prescribed length may be included between the frames. The one frame illustrated in FIG. 3 may have a length of around 30 to 50 milliseconds, for example.

In the electronic device 1 according to the embodiment, the signal generation processor 11 may generate a transmission signal having a suitable number of frames. In FIG. 3, illustration of some of the chirp signals is omitted. Thus, the relationship between the time and frequency of the transmission signal generated by signal generation processor 11 may be stored, for example, in a storage unit of the signal processor 10.

Thus, the electronic device 1 according to the embodiment may transmit a transmission signal consisting of a subframe containing multiple chirp signals. The electronic device 1 according to the embodiment may transmit a transmission signal consisting of a frame containing a prescribed number of subframes.

Hereafter, the electronic device 1 will be described as transmitting a transmission signal having the frame structure illustrated in FIG. 3. However, the frame structure illustrated in FIG. 3 is merely an example and, for example, the number of chirp signals included in one subframe may be set as appropriate. In other words, in the embodiment, the signal generation processor 11 may generate a subframe containing a suitable number (for example, a suitable plurality of) chirp signals. The subframe structure illustrated in FIG. 3 is also merely an example and the number of subframes included in one frame may be set as appropriate. In other words, in the embodiment, the signal generation processor 11 may generate a frame containing a suitable number (for example, a suitable plurality of) subframes. The signal generation processor 11 may generate signals having different frequencies. The signal generation processor 11 may generate multiple discrete signals of bandwidths having different frequencies f.

Figure 4:
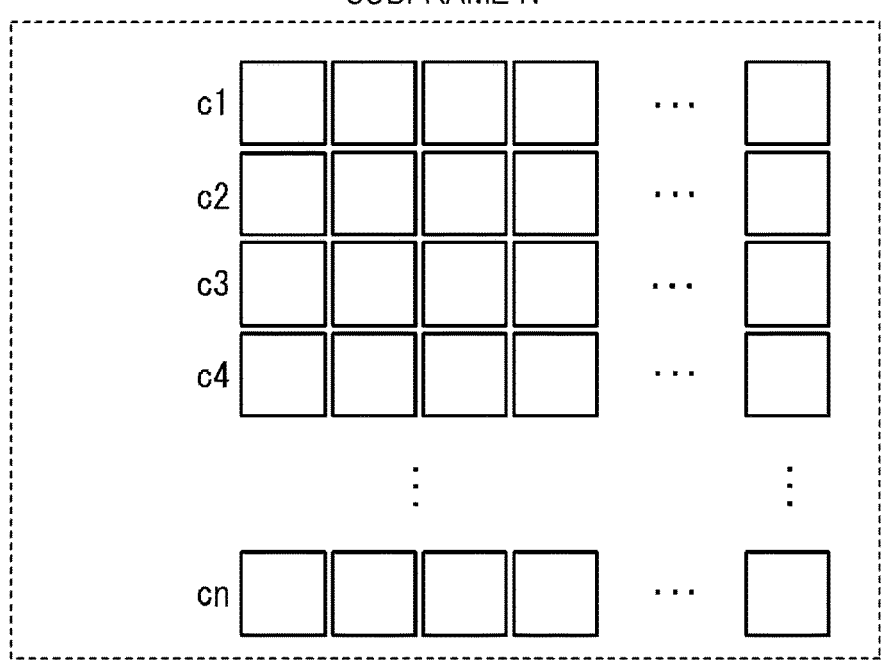
FIG. 4 is a diagram for describing processing of a signal performed by the electronic device according to the embodiment.

FIG. 4 is a diagram illustrating part of the subframes in FIG. 3 in a different manner. FIG. 4 illustrates samples of a reception signal resulting from reception of the transmission signal illustrated in FIG. 3 obtained by performing a two-dimensional fast Fourier transform (2D-FFT). The 2D-FFT is a process performed in the reception signal processor 12 (FIG. 2) of the signal processor 10.

As illustrated in FIG. 4, the chirp signals c1, c2, c3, c4, . . . , cn are stored in the individual subframes, i.e., subframe 1, . . . , subframe N. In FIG. 4, the chirp signals c1, c2, c3, c4, . . . , cn each consist of samples represented by a horizontally arrayed row of squares. The reception signal illustrated in FIG. 4 is subjected to 2D-FFT, CFAR, and integrated signal processing for each subframe in the reception signal processor 12 illustrated in FIG. 2.

Figure 5:
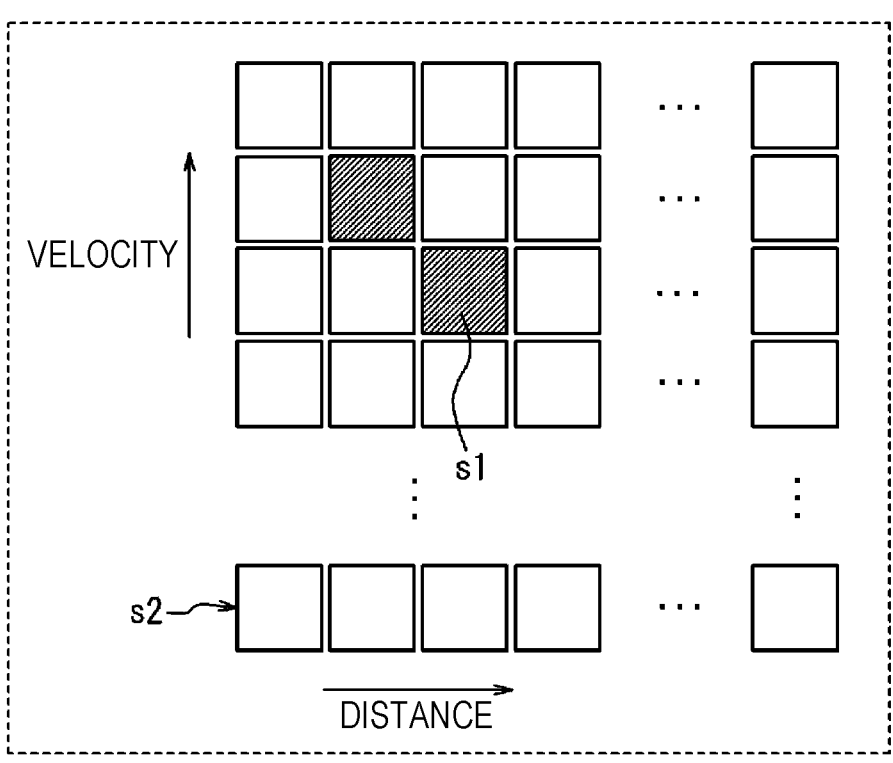
FIG. 5 is a diagram for describing processing of a signal performed by the electronic device according to the embodiment.

FIG. 5 illustrates an example of a point group on a range-Doppler (distance-velocity) plane calculated by performing 2D-FFT, CFAR, and integrated signal processing of each subframe in the reception signal processor 12 illustrated in FIG. 2.

In FIG. 5, the horizontal direction represents range (distance) and the vertical direction represents velocity. A shaded point group s1, illustrated in FIG. 5, is a group of points representing a signal that exceeds the CFAR threshold processing. An unshaded point group s2, illustrated in FIG. 5, illustrates a bin (2D-FFT sample) that did not exceed the CFAR threshold and does not have point group. For the point groups on the range-Doppler plane calculated in FIG. 5, the direction from the radar is calculated by direction estimation, and the position and velocity on a 2-D plane are calculated as a point group representing the object 200. Here, the direction estimation may be calculated using beamformers and/or subspace methods. Examples of typical subspace method algorithms include multiple signal classification (MUSIC) and estimation of signal parameters via rotation invariance technique (ESPRIT).

Figure 6:
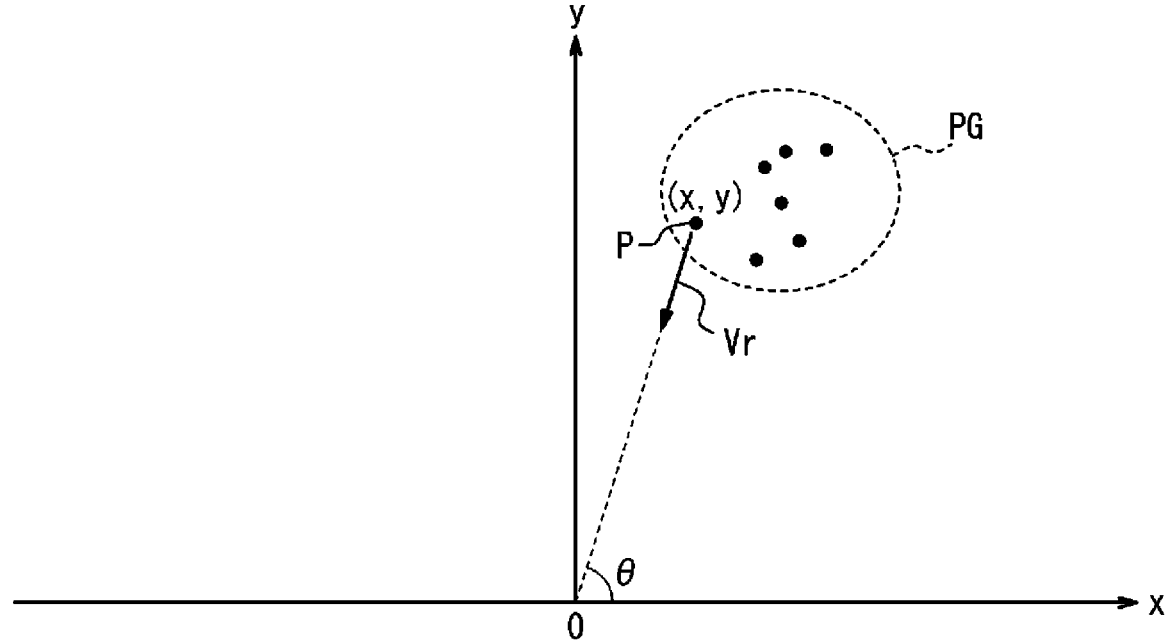
FIG. 6 is a diagram for describing processing of a signal performed by the electronic device according to the embodiment.

FIG. 6 illustrates an example of results obtained by the reception signal processor 12 transforming the point group coordinates from the range-Doppler plane illustrated in FIG. 5 to the XY plane after the direction estimation. As illustrated in FIG. 6, the reception signal processor 12 is able to plot a point group PG on the XY plane. The point group PG is made up of individual points P. Each point P has an angle θ and a radial velocity Vr in polar coordinates.

Next, CFAR processing performed by the electronic device 1 according to the embodiment will be described. First, description will be made that partially includes description of general CFAR processing performed in technologies such as millimeter wave radar.

Figure 7:
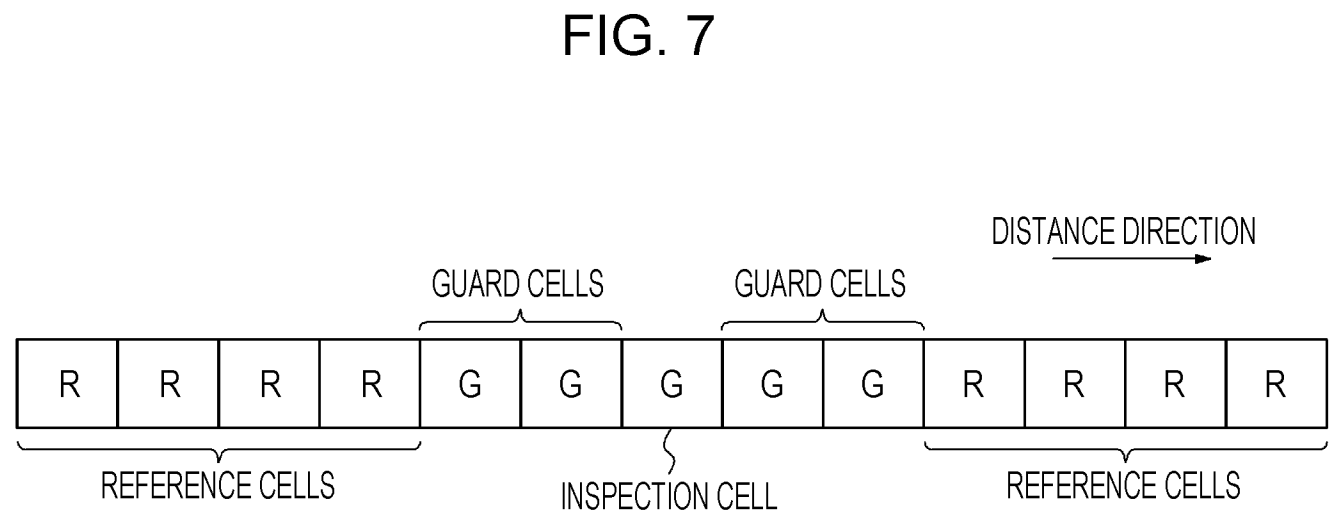

FIG. 7 is a diagram illustrating an example of the arrangement of cells when the electronic device 1 according to the embodiment performs CFAR processing. FIG. 7 conceptually illustrates an example of the manner in which an inspection cell (test cell) T, reference cells R, and guard cells G are disposed when CFAR processing is performed by the electronic device 1 according to the embodiment.

The electronic device 1 according to the embodiment may perform CFAR processing using cells arranged in a distance direction illustrated in FIG. 7 from left to right. The cell T illustrated in FIG. 7 represents an inspection cell (test cell) where CFAR testing is performed by the electronic device 1. The cells R illustrated in FIG. 7 represent reference cells used to calculate a threshold when the electronic device 1 performs CFAR processing for the inspection cell T. The cells G, illustrated in FIG. 7, represent guard cells disposed so that the inspection cell T does not affect the calculation of the threshold when the electronic device 1 performs CFAR processing.

In the example illustrated in FIG. 7, the guard cells G are disposed in a set of four, with two before and two after the inspection cell T. In the example illustrated in FIG. 7, a total of eight reference cells R are disposed with four after and four before the guard cells G, which are disposed either side of the inspection cell T. However, in the embodiment, the guard cells G and/or reference cells R may be disposed in a different manner from that illustrated in FIG. 7. For example, a total of M reference cells R may be disposed before and after the inspection cell T. A total of N guard cells G may be disposed before and after the inspection cell T. Here, the guard cells G may be disposed between inspection cell T and the reference cells R.

Several CFAR processing methods have been proposed depending on the method used to calculate the threshold for CFAR processing from the reference cells R as illustrated in FIG. 7. For example, CFAR processing methods including cell averaging (CA)-CFAR, order static (OS)-CFAR, Weibull CFAR, and lognormal CFAR have been proposed. CFAR processing is very important in radar technology for reducing and making the false alarm rate (FAR) constant. In radar technology, not only reflections from objects that are targets, but also reflections from objects that are not targets, i.e., clutter, are detected. Reflections from objects other than target objects, i.e., clutter, result in false detection information. CFAR processing is processing for reducing the false alarm rate (FAR) to a certain percentage.

As mentioned above, there are various methods of CFAR processing. Among these methods, OS-CFAR, which is based on the statistical properties of clutter, is used in many situations. For example, let us assume a case where statistical properties of clutter, i.e., the probability density function (PDF) of the intensity distribution of clutter, are described by a single parameter, such as a Rayleigh distribution. In this case, for OS-CFAR, the CFAR threshold is set by multiplying the value of one of the ranks (orders) of the reference cells R sorted in accordance with their intensity by a prescribed coefficient. The probability density of clutter may strictly follow a PDF described by two parameters, such as a Weibull distribution. However, a PDF described by two parameters, such as a Weibull distribution, can be converted into a one-parameter PDF by using a logarithmic amplifier or the like. Therefore, OS-CFAR can be applied in such cases. In a PDF distribution described by a single parameter, the likelihood is described by a very simple algebraic expression.

As an example of a suitable operation performed by the electronic device 1 according to the embodiment, a case in which OS-CFAR processing is performed is described below. However, the electronic device 1 according to the embodiment may perform other processing, such as CA-CFAR processing, for example.

Next, the sequence of OS-CFAR processing performed by the electronic device 1 according to the embodiment will be further described. First, the reference cells R illustrated in FIG. 7 are rearranged in order so that the values of the reference cells R are in the order illustrated in the following Equation (1). Here, $x_i$ represents the i-th reference cell in ascending order.

12

[Math 1]
$$x_1 \leq x_2 \leq \ldots \leq x_k \leq \ldots \leq x_M \qquad \text{Equation (1)}$$

Hereafter, a case where a probability density function p(x) is expressed as a one-parameter analytical expression is described. In OS-CFAR processing, a threshold Th is determined using a certain real constant $\alpha$ and the value $x_k$ of the kth reference cell R, as in the following Equation (2).

[Math 2]
$$Th = \alpha x_k \qquad \text{Equation (2)}$$

A CFAR criterion is satisfied if a value $x_{test}$ of the inspection cell T satisfies the following Equation (3). In this case, the value $x_{test}$ of the inspection cell T may be the Boolean value of 1.

[Math 3]
$$x_{test} \geq Th \qquad \text{Equation (3)}$$

As an example, a case where the probability density function is a Rayleigh distribution will be considered. That is, let us suppose that the probability density function p(x) can be expressed as the following Equation (4).

[Math 4]
$$p(x) = \frac{x}{\sigma^2} \exp\left(-\frac{x^2}{2\sigma^2}\right) \qquad \text{Equation (4)}$$

In this case, the false alarm rate $P_N$ from the OS-CFAR processing as illustrated in Equations (2) and (3) above can be expressed using gamma functions $\Gamma$ as in Equation (5) below.

[Math 5]
$$P_N = \frac{\Gamma(1+M)\Gamma(1+M-k+\alpha^2)}{\Gamma(1+M-k)\Gamma(1+M+\alpha^2)} \qquad \text{Equation (5)}$$

In other words, we can see that the false alarm rate $P_N$ is determined by determining the value of $\alpha$ in the above Equation (2) and further determining which reference cell R to use to set the threshold Th. We can also see that the false alarm rate $P_N$ may be determined by simply determining $\alpha$ and k.

Next, in description of the operation of the electronic device 1 according to the embodiment, first, the current state of the art of typical millimeter-wave radar will be described.

Currently, millimeter wave radar technology is rapidly becoming more widely used in vehicle applications, for example. Hereafter, a millimeter wave band is assumed to include a 24 GHz band (21.65 GHz to 26.65 GHz), a 60 GHz band (60 GHz to 61 GHz), a 76 GHz band (76 GHz to 77 GHz), and a 79 GHz band (77 GHz to 81 GHz). Radar technology, including millimeter-wave radar, can be used in a great many applications including air traffic control, military, marine, and vehicular applications. Clutter in airborne and marine radar is assumed to include ground clutter, sea clutter, and weather clutter. CFAR processing is a way of reducing and making the detection rate of clutter constant using the statistical properties of the different types of clutter. Therefore, CFAR processing is more likely to work properly when there are no spatially dense occurrences of objects that do not have statistical properties. However, if there are many radar responses in the space being subject to detection that deviate from the assumed statistical properties, the CFAR processing might not produce good results.

Millimeter wave radar is often used in dense urban areas and in traffic environments such as parking lots. For this reason, the actors and/or other structures in the traffic environment to be detected, such as vehicles and/or people, are usually densely disposed. Thus, if there are many objects in the millimeter wave radar detection range, we may assume that there will be multiple cells having reflections from objects among the millimeter wave radar reference cells R. When there are many objects in the millimeter-wave radar detection range, these objects will not follow the probability density distribution of clutter. Therefore, $x_k$ appearing in Equation (2) can no longer be expressed using the false alarm rate $P_N$ appearing in Equation (5) above. In this case, if the rank used to determine the threshold used in CFAR processing is uniformly determined using a constant k, the threshold used in CFAR processing will significantly increase and the mathematical assumptions will break down. This makes it impossible to properly perform CFAR processing, which is for reducing and making the false alarm rate constant, due to the original statistical properties of the clutter. In such cases, OS-CFAR processing may also fail to be performed properly. Specifically, for example, when CFAR processing is used to remove clutter caused by slight road surface unevenness and the like, the statistical properties of clutter in the space as a whole may be disturbed. In such cases, clutter cannot be removed completely and this may cause false alarm problems. For example, even if an object is present in the inspection cell T, the object is expected to be excluded in accordance with the threshold of CFAR processing and go undetected. In such cases, object detection may be incomplete and a problem of no alarm being issued may arise.

In the above description, the probability density function p(x), which represents the received level of clutter, is assumed to be described by a single parameter. However, the same applies in a case where the distribution of the probability density function p(x), which represents the received level of clutter, is described by two parameters such as Weibull distribution. In OS-CFAR processing, if the clutter follows a two-parameter probability density function, the value of the 1-th reference cell $x_1$ will be used in addition to the value of the k-th reference cell $x_k$ when determining the threshold.

As mentioned above, in general millimeter-wave radar, when CFAR processing, including OS-CFAR, is performed in an environment containing multiple objects, specific noise, and/or multiple paths, difficulties may arise when these objects and so forth are included in the reference cells R.

Therefore, the electronic device 1 according to the embodiment uses the properties of the probability density function, which can be described by one parameter as described above, in order to adaptively vary the CFAR threshold in accordance with each inspection cell T. This type of operation is further described below.

Figure 8:
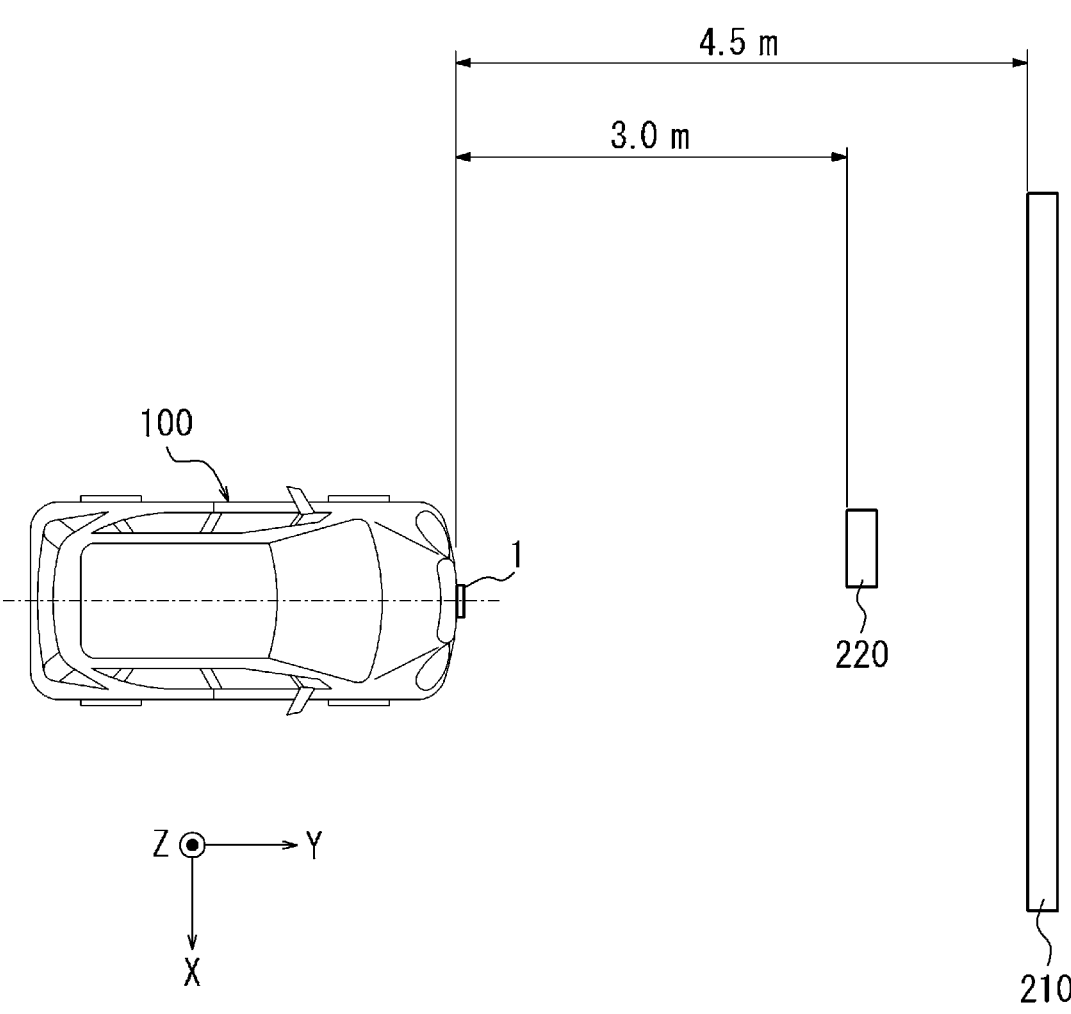
FIG. 8 is a diagram for describing an example of operation of the electronic device according to the embodiment.

FIG. 8 is a diagram for describing an example of operation of the electronic device 1 according to the embodiment. FIG. 8 illustrates a case in which the object 200 has been replaced with other objects in the situation illustrated in FIG. 1. As illustrated in FIG. 8, the electronic device 1 is assumed to be installed at the front of the mobile object 100, which is an automobile, for example. The electronic device 1 may also be installed at the rear of the mobile object 100, which is an automobile, for example. The electronic device 1 is assumed to be installed at a position 50 cm above the ground (road surface).

As illustrated in FIG. 8, we will assume that there is a relatively large object 210, such as a concrete wall for example, at a position 4.5 m in front of the mobile object 100 (electronic device 1). As illustrated in FIG. 8, we will also assume that a relatively small object 220, such as a car stopper for example, is disposed at a position 3.0 m in front of the mobile object 100 (electronic device 1). Here, the object 210 and the object 220 are both assumed to be stationary. The mobile object 100 (electronic device 1) is also assumed to be stationary. When OS-CFAR processing of the related art is performed in this situation, the (relatively small) object 220 is masked by the (relatively large) object 210 and this results in the (relatively small) object 220 being difficult to detect.

Figure 9:
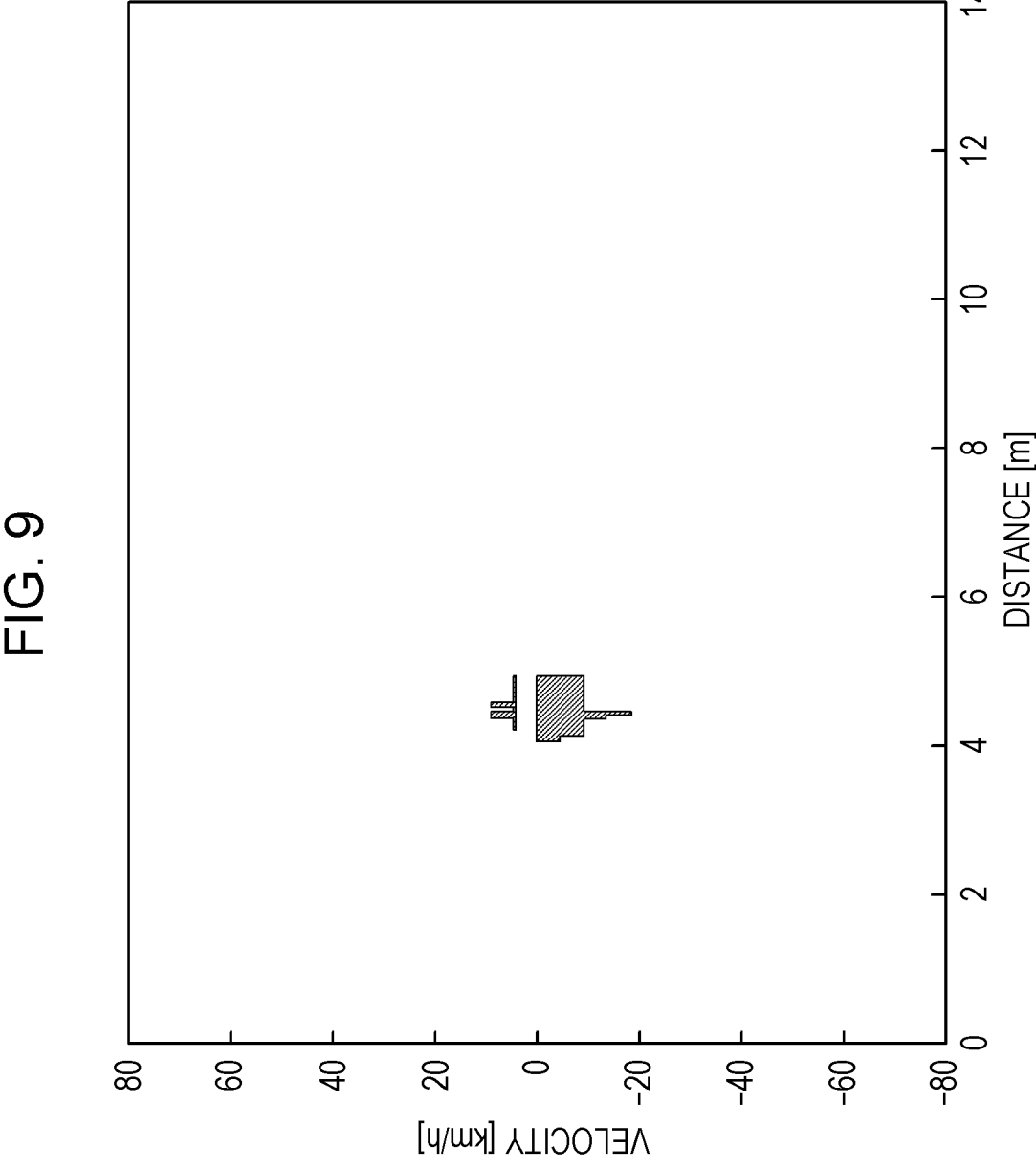
FIG. 9 is a diagram illustrating a comparative example of operation of the electronic device according to the embodiment.

FIG. 9 illustrates an example of results obtained when (general) OS-CFAR processing of the related art is performed in the situation illustrated in FIG. 8. FIG. 9 illustrates results obtained when 2D-FFT is performed in accordance with the procedure of the OS-CFAR processing of the related art in the situation illustrated in FIG. 8 for each sample of a reception signal. In FIG. 9, the horizontal direction represents range (distance) and the vertical direction represents velocity (relative velocity).

As illustrated in FIG. 9, an object is detected in the vicinity of a region at a distance of 4.5 m at a velocity of zero. In other words, in the example illustrated in FIG. 9, a case in which the (relatively large) object 210 illustrated in FIG. 8 is properly detected is illustrated. On the other hand, as illustrated in FIG. 9, no object was detected in the vicinity of a region at a distance of 3.0 m at a velocity of zero. In other words, in the example illustrated in FIG. 9, a case in which the (relatively small) object 220 illustrated in FIG. 8 is not properly detected is illustrated. Thus, in OS-CFAR processing of the related art, small objects are sometimes masked by larger objects such as walls and not detected, and only larger objects are detected.

Next, operation of the electronic device 1 according to the embodiment will be described. The following description focuses on the points that are different from the (general) OS-CFAR processing of the related art in the electronic device 1 according to the embodiment. Content that is simplified or omitted in the following description may be assumed to be substantially the same as or based on (general) OS-CFAR processing of the related art.

The processing described below may be performed in the signal processor 10 of the electronic device 1 according to the embodiment. In particular, the processing described below may be performed in the reception signal processor 12 of the signal processor 10. Hereinafter, a case where the distribution of clutter is approximated using a Rayleigh distribution that can be described by a single parameter will be described. Thus, in the electronic device 1 according to the embodiment, the signal processor 10 may approximate the distribution of clutter using a Rayleigh distribution described by a single parameter.

In order to address the problems arising in OS-CFAR processing of the related art, the electronic device 1 according to the embodiment compares the value $x_k$ of the selected reference cell R (see Equation (2) above) with the false alarm rates $P_N$ and $L_F$. Here, the false alarm rates $P_N$ and $L_F$ may be obtained by determining separately estimated Rayleigh distributions from maximum likelihood estimated values of the parameters.

If the probability density function of clutter is described by the Rayleigh distribution illustrated in Equation (4)

above, the parameter σ of the probability density function is described as in Equation (6) below.

[Math 6]

$$\sigma = \sqrt{\frac{1}{2n}\sum_{i=1}^{n} x_i^2}$$

Equation (6)

where n is the total number of samples. Also, $x_i$ is an observed value.

The samples for deriving the maximum likelihood estimated value of the parameter σ in above Equation (6) may be from a region on the range-Doppler plane (refer to FIG. 5) resulting from a 2-D FFT that is assumed to be unlikely to contain reflections of any objects. The region assumed to be unlikely to contain reflections of any objects may be a high velocity region, for example, from a hundred to two hundred kilometers per hour. The samples for deriving the maximum likelihood estimated value of the parameter σ in the above Equation (6) may consist of around 10 to 50 points extracted from such a high velocity region, for example. Thus, in the electronic device 1 according to the embodiment, the signal processor 10 may extract the samples for deriving the maximum likelihood estimated value from a region greater than or equal to a prescribed velocity.

The cumulative distribution function F(x) of the Rayleigh distribution using σ is as expressed in Equation (7) below.

[Math 7]

$$F(x) = 1 - \exp\left(-\frac{x^2}{2\sigma^2}\right)$$

Equation (7)

Therefore, the maximum likelihood estimated values $P_N$ and $L_F$ of the false alarm rates can be expressed as in Equation (8) below.

[Math 8]

$$P_{N,LF} = \exp\left(-\frac{x^2}{2\sigma^2}\right)$$

Equation (8)

By setting the desired false alarm rate $P_N$ or $L_F$ to a desired value in the above Equation (8), the intensity X that gives that false alarm rate can be calculated in reverse as in the following Equation (9).

[Math 9]

$$X = \sigma\sqrt{-2\log P_{N,LF}}$$

Equation (9)

Here, we assume that the clutter is similar in all cells on the range-Doppler plane (refer to FIG. 5) and that the distributions of the clutter are close to the same Rayleigh distribution. Therefore, the value $x_k$ of the reference cell R selected for OS-CFAR processing is assumed to be about the same as X. Therefore, if $x_k$ becomes significantly larger than X, $x_k$ is preferably reselected. In other words, the value $x_k$ of the selected reference cell R preferably satisfies the condition represented by the following Equation (10) using a prescribed positive real coefficient β.

[Math 10]

$$x_k \le \beta X$$

Equation (10)

Here, β may be set as appropriate in the range from around 0.1 to 1. β may be set as appropriate in a range from around 0.1 to 1.5 depending on, for example, the intended application.

The electronic device 1 according to the embodiment determines the threshold for OS-CFAR processing using the reference cell R selected in the manner described above. After that, the electronic device 1 according to the embodiment may perform signal processing for object detection based on substantially the same procedure as in OS-CFAR processing of the related art.

Figure 10:
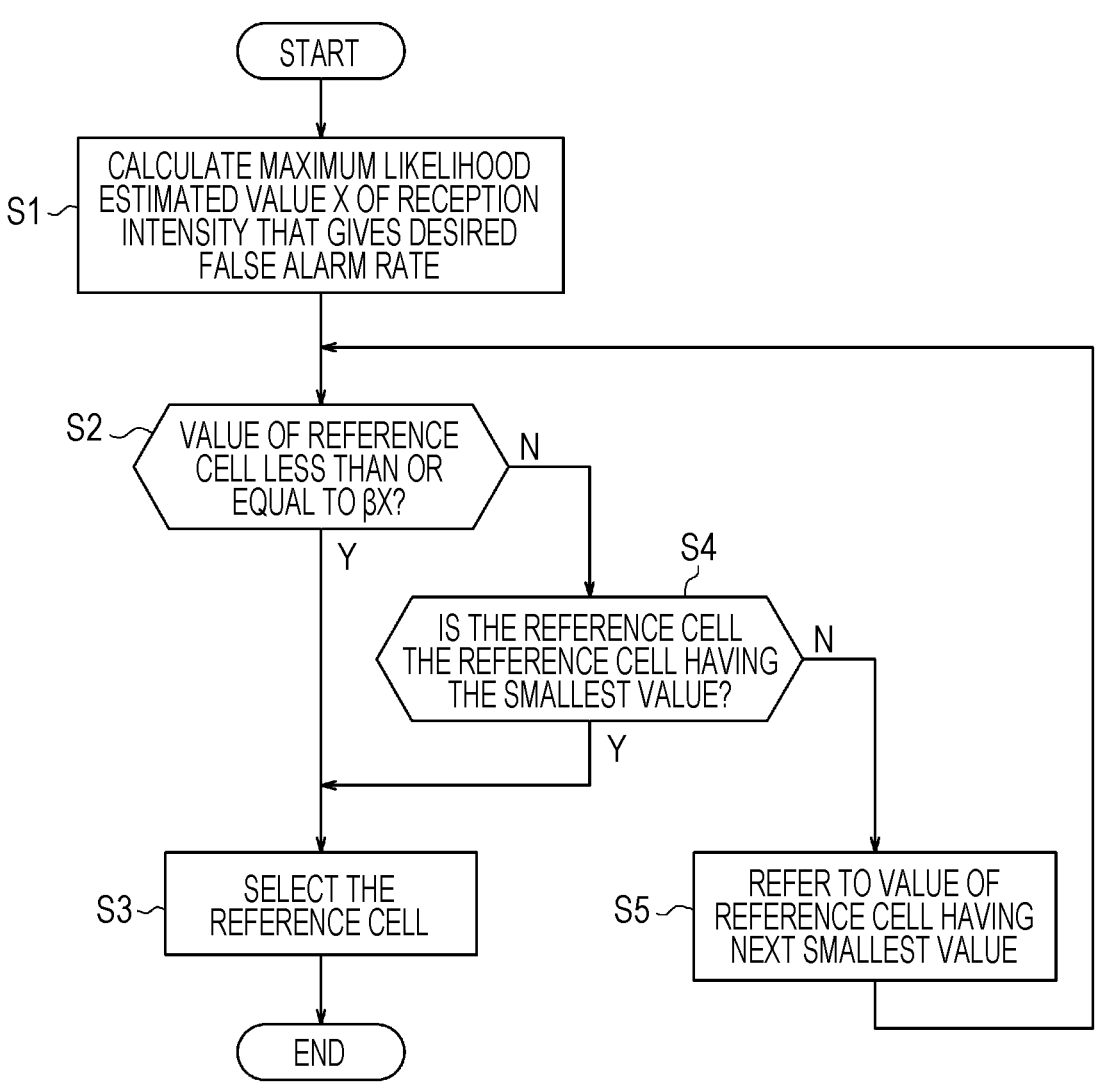
FIG. 10 is a flowchart for describing operation of the electronic device according to the embodiment.

FIG. 10 is a flowchart for describing operation of the electronic device 1 according to the embodiment. FIG. 10 illustrates the procedure for selecting a reference cell to be used in OS-CFAR according to the embodiment by the electronic device 1, as described above. In the electronic device 1 according to the embodiment, operations other than those illustrated in FIG. 10 may be performed in substantially the same manner as or based on OS-CFAR processing of the related art.

When the operation illustrated in FIG. 10 starts, the reception signal processor 12 of the signal processor 10 calculates a maximum likelihood estimated value X of the reception level (intensity) that gives the desired false alarm rate (Step S1). In Step S1, the reception signal processor 12 may calculate the maximum likelihood estimated value X based on Equations (6) to (9) given above.

After the maximum likelihood estimated value X is calculated in Step S1, the reception signal processor 12 determines whether or not the value $x_k$ of the reference cell R to be considered for selection is less than or equal to βX (Step S2). That is, in Step S2, the reception signal processor 12 determines whether or not the value $x_k$ of the reference cell R being considered for selection satisfies the above Equation (10).

When the value $x_k$ of the reference cell R is less than or equal to βX in Step S2, the reception signal processor 12 may decide to select that reference cell R (Step S3). That is, if the value $x_k$ of the reference cell R satisfies the above Equation (10) in Step S2, the reception signal processor 12 advances to Step S3 and selects that reference cell R. Thus, in the electronic device 1 according to the embodiment, the signal processor 10 may select a reference cell R if the value of the reference cell R is less than or equal to the value βX based on the maximum likelihood estimated value.

Once the reference cell R has been selected in Step S3, the reception signal processor 12 completes the operation illustrated in FIG. 10 and may then proceed with object detection processing substantially the same as that in OS-CFAR of the related art. For example, after Step S3, the reception signal processor 12 may calculate the threshold for OS-CFAR processing based on the value of the selected reference cell R and perform object detection processing the same as or similar to that in OS-CFAR of the related art.

On the other hand, when the value $x_k$ of the reference cell R is not less than or equal to βX in Step S2, the reception signal processor 12 may decide to not select that reference cell R and instead advance to the processing of Step S4. In other words, advancing to the processing of Step S4 corresponds to a case where the value $x_k$ of the reference cell R being considered for selection does not satisfy the above Equation (10). Thus, in the electronic device 1 according to the embodiment, the signal processor 10 may decide to not select the reference cell R when the value of the reference cell R exceeds the value $\beta X$ based on the maximum likelihood estimated value.

In Step S4, the reception signal processor 12 determines whether the reference cell R is the reference cell having the smallest value. That is, in Step S4, the reception signal processor 12 determines whether the value of the reference cell R is the smallest value among the multiple reference cells R prepared as candidates for selection.

When the reference cell R has the smallest value in Step S4, there are no reference cells having a smaller value among the multiple reference cells R prepared as candidates for selection. Therefore, in this case, the reception signal processor 12 advances to Step S3 and selects that reference cell R. Thus, in the electronic device 1 according to the embodiment, the signal processor 10 may select a reference cell R when the value of the reference cell R exceeds the value $\beta X$ based on the maximum likelihood estimated value, and when there is no reference cell having the next smallest value with respect to the value of that reference cell R.

On the other hand, when the reference cell R does not have the smallest value in Step S4, there is a reference cell having a smaller value among the multiple reference cells R prepared as candidates for selection. Therefore, in this case, the reception signal processor 12 advances to Step S5 and refers to the value of the reference cell R with the next smallest value. Thus, in the electronic device 1 according to the embodiment, the signal processor 10 may select a reference cell having the next smallest value with respect to the reference cell R when the value of the reference cell R exceeds the value $\beta X$ based on the maximum likelihood estimated value.

Once the value of the reference cell R having the next small value has been referenced in Step S5, the reception signal processor 12 returns to Step S2 and determines whether the value $x_k$ of that reference cell R is less than or equal to $\beta X$. After that, the reception signal processor 12 can continue to operate in substantially the same as manner as described above.

As described above, the signal processor 10 of the electronic device 1 according to the embodiment detects an object, with a constant false alarm rate, based on a transmission signal transmitted as a transmission wave and a reception signal received as a reflection wave. The signal processor 10 selects a reference cell based on a maximum likelihood estimated value that gives the false alarm rate of the signal intensity based on the reception signal. The reference cell is disposed in the distance direction with respect to the inspection cell in a two-dimensional distribution of signal intensity, based on the reception signal, in the distance direction and the relative velocity direction. The signal processor 10 may also set the threshold used in object detection based on the signal intensity in the reference cell R. The signal processor 10 may also set the threshold used in object detection based on the order statistics of the signal intensity in the reference cell R.

Figure 11:
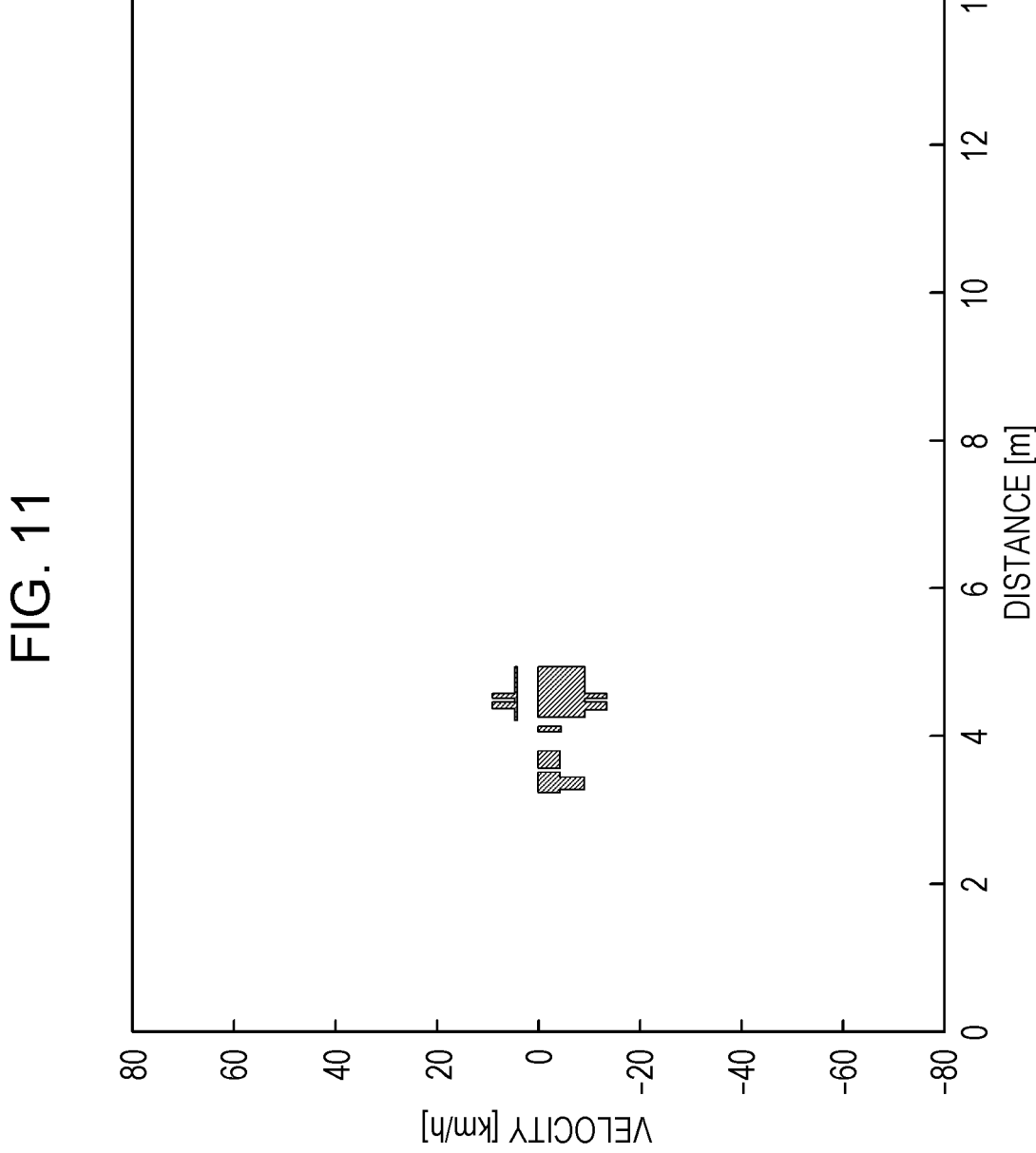
FIG. 11 is a diagram illustrating an example of operation of the electronic device according to the embodiment.

FIG. 11 is a diagram illustrating an example of results obtained when OS-CFAR processing is performed by the electronic device 1 according to the embodiment in the situation illustrated in FIG. 8. FIG. 11 illustrates the results of 2D-FFT performed by the electronic device 1 according to the embodiment, for each sample of the reception signal, in accordance with the OS-CFAR processing procedure in the situation illustrated in FIG. 8. In FIG. 11, the horizontal direction represents range (distance) and the vertical direction represents velocity (relative velocity).

As illustrated in FIG. 11, an object is detected in the vicinity of a region at a distance of 4.5 m at a velocity of zero. In other words, the example illustrated in FIG. 11 illustrates that the (relatively large) object 210 illustrated in FIG. 8 is properly detected, similarly to the example illustrated in FIG. 9. As illustrated in FIG. 11, an object is detected in the vicinity of a region at a distance of 3.0 m at a velocity of zero. In other words, the example illustrated in FIG. 11 illustrates that the (relatively small) object 220 illustrated in FIG. 8 is also properly detected, in contrast to the example illustrated in FIG. 9. Thus, in the OS-CFAR processing performed by the electronic device 1 according to the embodiment, even relatively small objects can be detected without being masked by relatively large objects such as walls. Therefore, objects can be detected with good accuracy by the electronic device 1 according to the embodiment.

As described above, the electronic device 1 according to the embodiment can reduce the no alarm rate arising from OS-CFAR processing. In addition, in the electronic device 1 according to the embodiment, the false alarm rate $P_N$ from CFAR processing can be set to be low because the no alarm rate can be kept low.

In the above embodiment, a case has been described in which the distribution of clutter is approximated by a Rayleigh distribution that can be described by a single parameter. When the probability density function of the clutter is approximated by a two-parameter function, such as the Weibull distribution for example, the function can be converted into a one-parameter distribution function, such as a Rayleigh distribution, by performing mathematical processing. Therefore, even when the probability density function of clutter is approximated by a two-parameter function, processing can be performed by the electronic device 1 according to the embodiment by converting the two-parameter function into a one-parameter distribution function.

The present disclosure has been described based on the drawings and examples, but note that a variety of variations and amendments may be easily made by one skilled in the art based on the present disclosure. Therefore, note that such variations and amendments are included within the scope of the present disclosure. For example, the functions included in each functional part can be rearranged in a logically consistent manner. Multiple functional parts and so forth may be combined into a single part or divided into multiple parts. Further, each embodiment according to the present disclosure described above does not need to be implemented exactly as described in the embodiment, and may be implemented with features having been combined or omitted as appropriate. A variety of variations and amendments to the content of the present disclosure can be made by one skilled in the art based on the present disclosure. Therefore, such variations and amendments are included in the scope of the present disclosure. For example, in each embodiment, each functional part, each means, each step and so on can be added to other embodiments so long as there are no logical inconsistencies, or can be replaced with each functional part, each means, each step, and so on of other embodiments. In each embodiment, a plurality of each functional part, each means, each step, and so on can be combined into a single functional part, means, or step or divided into multiple functional parts, means, or steps. Each of the above-described embodiments of the present disclosure is not limited to faithful implementation of each of the described embodiments, and may be implemented by combining or omitting some of the features as appropriate.

The above-described embodiment is not limited to only being implemented as the electronic device 1. For example, the embodiment described above may be implemented as a method of controlling a device such as the electronic device 1. For example, the embodiment described above may be implemented as a program executed by a device such as the electronic device 1 or any suitable computer.

REFERENCE SIGNS

1 electronic device
10 signal processor
11 signal generation processor
12 reception signal processor
13 communication interface
21 transmission DAC
22 transmission circuit
23 millimeter wave transmission circuit
24 transmission antenna array
31 reception antenna array
32 mixer
33 reception circuit
34 reception ADC
50 controller

The invention claimed is:

1. An electronic device comprising:
a transmission antenna configured to transmit a transmission wave;
a reception antenna configured to receive a reflection wave resulting from reflection of the transmission wave; and
a signal processor configured to detect an object, with a constant false alarm rate, based on a transmission signal transmitted as the transmission wave and a reception signal received as the reflection wave,
wherein the signal processor selects, based on a maximum likelihood estimated value that gives a false alarm rate of signal intensity based on the reception signal, a reference cell disposed in a distance direction with respect to an inspection cell in a two-dimensional distribution of signal intensity, based on the reception signal, in the distance direction and a relative velocity direction.

2. The electronic device according to claim 1, wherein the signal processor selects the reference cell when a value of the reference cell is less than or equal to a value based on the maximum likelihood estimated value.

3. The electronic device according to claim 1, wherein the signal processor does not select the reference cell when a value of the reference cell exceeds a value based on the maximum likelihood estimated value.

4. The electronic device according to claim 1, wherein when a value of the reference cell exceeds a value based on the maximum likelihood estimated value, the signal processor selects a reference cell having a next smallest value with respect to the value of that reference cell.

5. The electronic device according to claim 1, wherein when a value of the reference cell exceeds a value based on the maximum likelihood estimated value, the signal processor selects that reference cell when there is no reference cell having a next smallest value with respect to that reference cell.

6. The electronic device according to claim 1, wherein the signal processor sets a threshold used in detection of the object based on signal intensity at the reference cell.

7. The electronic device according to claim 1, wherein the signal processor sets a threshold used in detection of the object based on order statistics of signal intensity at the reference cell.

8. The electronic device according to claim 1, wherein the signal processor approximates a clutter distribution using a Rayleigh distribution described using a single parameter.

9. The electronic device according to claim 1, wherein the signal processor extracts a sample for deriving the maximum likelihood estimated value from a range greater than or equal to a prescribed velocity.

10. A method for controlling an electronic device, the method comprising:
transmitting a transmission wave using a transmission antenna;
receiving a reflection wave generated by reflection of the transmission wave using a reception antenna;
detecting an object, with a constant false alarm rate, based on a transmission signal transmitted as the transmission wave and a reception signal received as the reflection wave, and
selecting, based on a maximum likelihood estimated value that gives a false alarm rate of signal intensity based on the reception signal, a reference cell disposed in a distance direction with respect to an inspection cell in a two-dimensional distribution of signal intensity, based on the reception signal, in the distance direction and a relative velocity direction.

11. A non-transitory computer-readable recording medium storing computer program instructions, which when executed by a computer, cause the computer to:
transmit a transmission wave using a transmission antenna;
receive a reflection wave generated by reflection of the transmission wave using a reception antenna;
detect an object, with a constant false alarm rate, based on a transmission signal transmitted as the transmission wave and a reception signal received as the reflection wave, and
select, based on a maximum likelihood estimated value that gives a false alarm rate of signal intensity based on the reception signal, a reference cell disposed in a distance direction with respect to an inspection cell in a two-dimensional distribution of signal intensity, based on the reception signal, in the distance direction and a relative velocity direction.

* * * * *